United States Patent [19]

Moerder

[11] Patent Number: 4,984,186
[45] Date of Patent: Jan. 8, 1991

[54] PHASE ACCUMULATOR WITH DITHERED INCREMENTING OF ACCUMULATION DUE TO FINE PHASE COMPONENTS

[75] Inventor: Karl E. Moerder, Poway, Calif.

[73] Assignee: Titan Linkabit Corporation, San Diego, Calif.

[21] Appl. No.: 398,703

[22] Filed: Aug. 25, 1989

[51] Int. Cl.$^5$ .............................................. G06F 1/02
[52] U.S. Cl. ...................................... 364/721; 328/14
[58] Field of Search ........................... 364/721; 328/14

[56] References Cited

U.S. PATENT DOCUMENTS

| 4,901,265 | 2/1990 | Kerr et al. | 364/721 |
| 4,905,177 | 2/1990 | Weaver, Jr. et al. | 364/721 |
| 4,935,891 | 6/1990 | Curry | 364/721 |

OTHER PUBLICATIONS

Wheatley and Phillips, "Spurious Suppression in Direct Digital Synthesizers", Proc. 35th Annual Frequency Control Symposium, May 1981, pp. 425–435.

Primary Examiner—David H. Malzahn
Attorney, Agent, or Firm—Edward W. Callan

[57] ABSTRACT

A phase accumulator for accumulating digital frequency words, which, as accumulated, represent the phase of a cyclic waveform of a predetermined frequency. The phase accumulator includes a coarse-component accumulator for accumulating coarse phase components of the digital frequency words; a fine-component accumulator for accumulating fine phase components of the digital frequency words; and means for incrementing the coarse-component accumulator in response to accumulation of the fine phase components. The incrementing means include means for providing a variable randomly generated value for each fine-component accumulation cycle; means for periodically sampling the accumulation of the fine phase components in relation to the randomly generated value; and means for incrementing the coarse component register for each fine-component accumulation cycle, with the phase of said incrementing being dithered in accordance with the number of times the accumulated fine phase components exceed the randomly generated values during the sampling period.

3 Claims, 2 Drawing Sheets

PHASE ACCUMULATOR WITH DITHERED INCREMENTING OF ACCUMULATION DUE TO FINE PHASE COMPONENTS

BACKGROUND OF THE INVENTION

The present invention generally pertains to phase accumulators, such as are used in direct digital frequency synthesizers, and is particularly directed to dithering the phase at which a coarse-component accumulator is incremented in response to accumulation of the fine phase components.

A direct digital frequency synthesizer generates an analog waveform of a predetermined frequency from accumulated digital frequency words, which, as accumulated, represent the phase of a cyclic waveform, such as a sine wave of said predetermined frequency. A typical prior art direct digital frequency synthesizer includes a phase accumulator for accumulating the digital frequency words and a phase-to-magnitude converter for converting the accumulated phase value into an analog waveform of the predetermined frequency. The phase-to-magnitude converter converts the phase value accumulated in the phase accumulator into an analog signal magnitude for the phase angle of the cyclic waveform that is represented by the phase value in the phase accumulator.

The phase accumulator has a length of m bits and is driven at a clock rate $f_c$. At each clock pulse, a frequency word having a length of k bits is added to the present value in the phase accumulator. The value in the phase accumulator increases at this rate until it overflows losing all bits that exceed $2^m - 1$. The phase value in the phase accumulator at any time represents the instantaneous phase angle of the cyclic waveform over a range of $2\pi$ radians.

There are $2^m$ different phase values; and the actual output frequency is g times $f_c/2^m$, where g can range from one to $2^m$. The frequency resolution is also equal to $f_c/2^m$, which means that the resolution requirements can generally be met by trading off $f_c$ and m.

The phase accumulator performs a phase calculation once each clock cycle by adding the frequency word, which is proportional to the desired output frequency, to the contents of the phase accumulator.

It is not practically feasible (or necessary) to retain every bit from the phase accumulator for use in a frequency synthesizer; so the phase accumulator is divided into a coarse-component accumulator and a fine-component accumulator. The full m bits are partitioned in c bits in the coarse-component accumulator and f bits in the fine-component accumulator. Only the c bits of the coarse-component accumulator are used to determine the phase value for one cycle of phase accumulator output, whereby phase resolution is limited to $2\pi/2^c$ radians. Both the coarse-component accumulator and the fine-component accumulator are clocked to run at a frequency of $f_c$. The minimum frequency that the coarse-component accumulator can provide is $f_c/2^c$ Hz. The fine-component accumulator provides finer frequency resolution by periodically adding a carry-in to the coarse-component accumulator's LSB of $2\pi/2^c$ radian. Given that the fine-component accumulator consists of f bits and also runs at $f_c$, the least carry-in rate it can provide is $f_c/2^f$. As each coarse LSB is worth $2\pi/2^f$. As each coarse LSB is worth $2\pi/2^c$ radians, the minimum average frequency added by the fine-component accumulator is $2\pi/2^c$ times $f_c/2^f$ radians/second or $f_c/2^{c+f}$ Hz. Since $m = c+f$, the overall resolution, as well as minimum step size remains unchanged by the separation.

Only the bits from the coarse-component accumulator (the c bits) are used to represent the necessary phase information with a resolution of $2\pi/2^c$ radian. As the remaining fine-component accumulator bits (the f bits) of the phase accumulator are ignored, the output phase function generally has a phase error with respect to the total phase function contained in the phase accumulator. The phase error is slightly periodic in time, with the resultant effect of spurious lines or phase modulation (PM) spurs (spurious signals) in the output spectrum.

It has been suggested that phase errors due to PM spurs can be suppressed by dithering the phase at which the coarse-component accumulator is incremented in response to accumulation of the fine phase components.

SUMMARY OF THE INVENTION

The present invention provides a phase accumulator in which the phase of incrementing the coarse-component register is randomly dithered in such manner that the dithering process itself does not introduce further PM spurs.

The present invention is a phase accumulator for accumulating digital frequency words, which, as accumulated, represent the phase of a cyclic waveform of a predetermined frequency, with the phase accumulator including a coarse-component accumulator for accumulating coarse phase components of the digital frequency words; a fine-component accumulator for accumulating fine phase components of the digital frequency words; and means for incrementing the coarse-component accumulator in response to accumulation of the fine phase components, wherein said incrementing means comprise means for providing a variable randomly generated value for each fine-component accumulation cycle; means for periodically sampling the accumulation of the fine phase components in relation to the randomly generated value; and means for incrementing the coarse component register for each fine-component accumulation cycle, with the phase of said incrementing being dithered in accordance with the number of times the accumulated fine phase components exceed the randomly generated values during the sampling period.

Referring to the incrementing-count timing diagram of FIG. 1, the boundaries of the fine-component-accumulation cycles are demarcated by solid lines A, the randomly generated values for the different fine-component-accumulation cycles are indicated by the dashed lines C, and the sampling times are indicated by the arrows $S_1$, $S_2$, $S_3$, . . . . A sampling period is the interval between the sampling times S, as determined by the phase accumulator clock signal. The relative durations of the fine-component-accumulation cycles and the sampling periods depends upon the sampling rate and the ratio of the values of the fine phase components of the digital frequency words to the value of the least significant bit of the coarse-component accumulator. For example, when samples are clocked by the phase accumulator clock signal, and the average value of the fine phase components of the digital frequency words is approximately one-half the value of the least significant bit of the coarse-component accumulator, the duration of the average fine-component-accumulation cycle is approximately twice that of the sampling period.

Still referring to FIG. 1, it is seen that at sampling times $S_1$ and $S_2$, the accumulated fine phase components have exceeded a randomly generated value once during each of the sampling periods preceding the respective sampling times $S_1$ and $S_2$. Accordingly, the coarse-component accumulator is then incremented by a count of 1. At sampling time $S_3$, the accumulated fine phase components have not exceeded a randomly generated value during the sampling period preceding the sampling time $S_3$, whereby the coarse-component accumulator is not then incremented. At sampling time $S_4$, the accumulated fine phase components have exceeded a randomly generated value twice during the sampling period preceding the sampling time $S_4$, whereby the coarse-component accumulator is then incremented by a count of 2.

The only anomalous components introduced by the randomly dithered phase incrementing scheme of the present invention are harmonics of the sampling frequency, which are already present in the phase accumulator by virtue of the phase accumulator being clocked at the sampling rate.

Additional features of the present invention are described in relation to the description of the preferred embodiment.

DESCRIPTION OF THE PREFERRED EMBODIMENT

Figure 1:
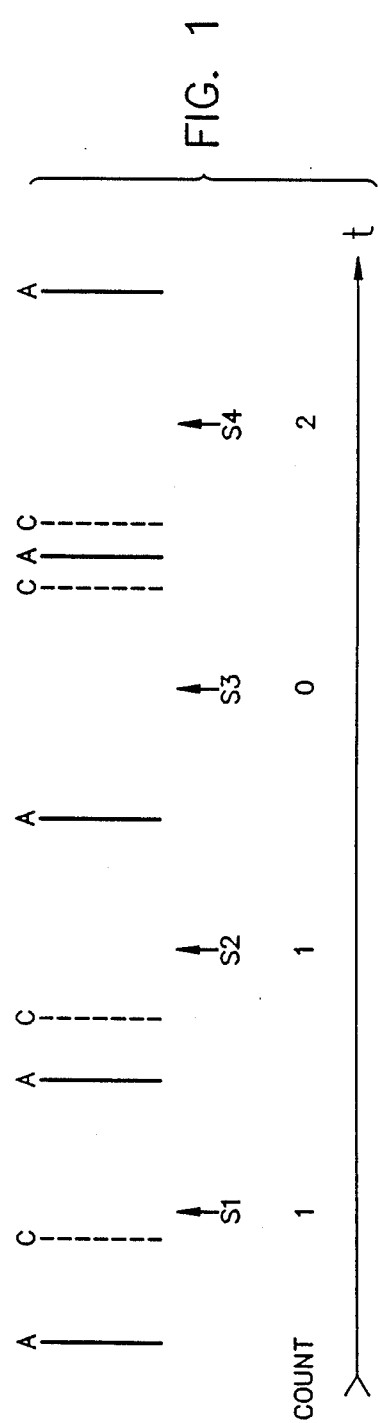
FIG. 1 is an incrementing-count timing diagram for the phase accumulator of the present invention.
Figure 2:
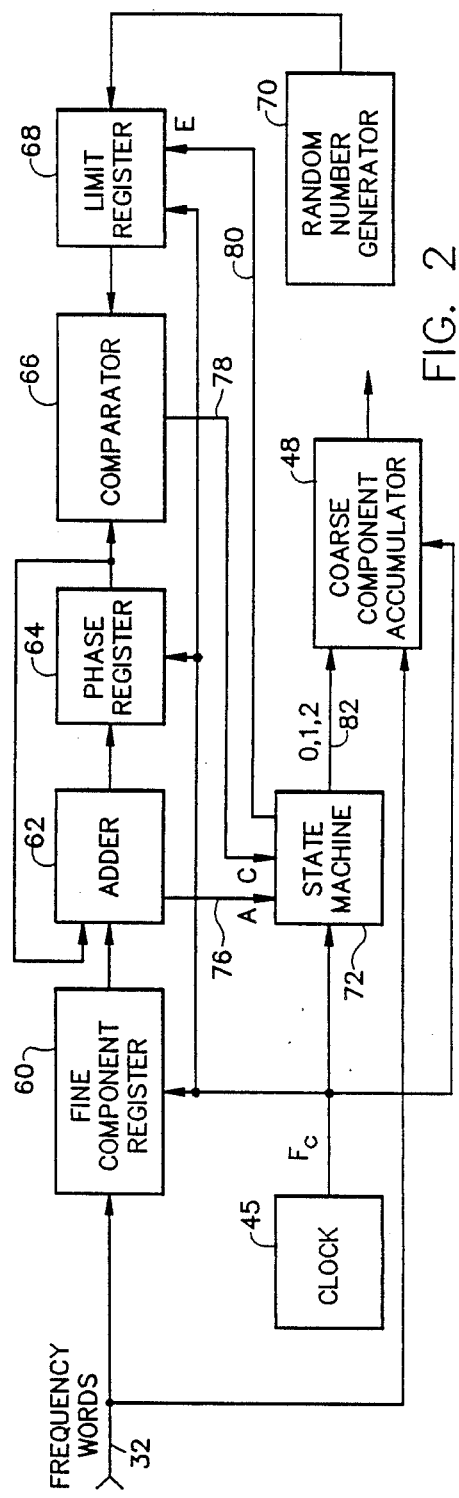
FIG. 2 is a block diagram of one preferred embodiment of the phase accumulator of the present invention.

Referring to FIG. 2, one preferred embodiment of the phase accumulator of the present invention includes an f-bit fine-component register 60, an adder 62, a phase register 64, a comparator 66, a limit register 68, a random number generator 70, a state machine 72, a c-bit coarse-component accumulator 48 and a clock 45. The f-bit fine-component register 60, the phase register 64, the limit register 68, the state machine 72, and the c-bit coarse-component accumulator 48 are synchronously clocked at a rate $f_c$ by a clock signal provided by the clock 45.

The phase accumulator is an m-bit accumulator for accumulating phase components of k-bit digital frequency words 52. The digital frequency words 52, as accumulated, represent the phase of a sine wave of a predetermined frequency.

The c-bit coarse-component accumulator 48 accumulates coarse phase components of the digital frequency words 52; and the f-bit fine-component register 60 registers fine phase components of the digital frequency words 52.

The fine phase components are shifted in parallel from the fine-component register 60 through the adder 62 into the phase register 64, and are accumulated in the phase register 64. Whenever the fine phase components accumulated in the phase register 64 exceed the capacity of the phase register 64, the adder 62 responds by providing an accumulator carry bit "A" to the state machine 72 via line 76.

The coarse-component accumulator 48 includes a coarse-component register, an adder and a phase register configured and operable in the same manner as the fine-component register 60, the adder 62 and the phase register 64.

The comparator 66 compares the value in the phase register 64 with the value in the limit register 68, and provides a comparator carry bit "C" to the state machine 72 via line 78 whenever the value in the phase register 64 exceeds the value in the limit register 68. The value in the limit register 68 is provided by the random number generator 70. A new value is entered into the limit register 68 from the random number generator 70 each time an enable signal "E" is provided on line 80 by the state machine 72.

The random number generator 70 is either a truly random number generator, as implemented by a noise quantization processor, for example, or a pseudo random number generator, as implemented by a shift register sequence generator, for example. The term "random number", as used herein, means both truly random numbers and pseudo random numbers.

Each time the state machine 72 is sampled by the clock signal from the clock 45, the state machine 72 provides a carry count of either 0, 1, or 2 to the coarse-component register 48 via lines 82 in accordance with the number of times the accumulated fine phase components exceed the randomly generated value during the sampling period, as indicated by a combination of the state of the state machine 72 and whether an accumulator carry bit A and/or a comparator carry bit C is provided to the state machine 72 when the state machine 72 is sampled.

The adder of the coarse-component accumulator 48 increments the accumulated coarse phase components in the phase register thereof by the carry count on line 82 from the state machine 72 together with and at the same time as when it increments such accumulated coarse phase components by the coarse phase component in the coarse-component register thereof.

Figure 3:
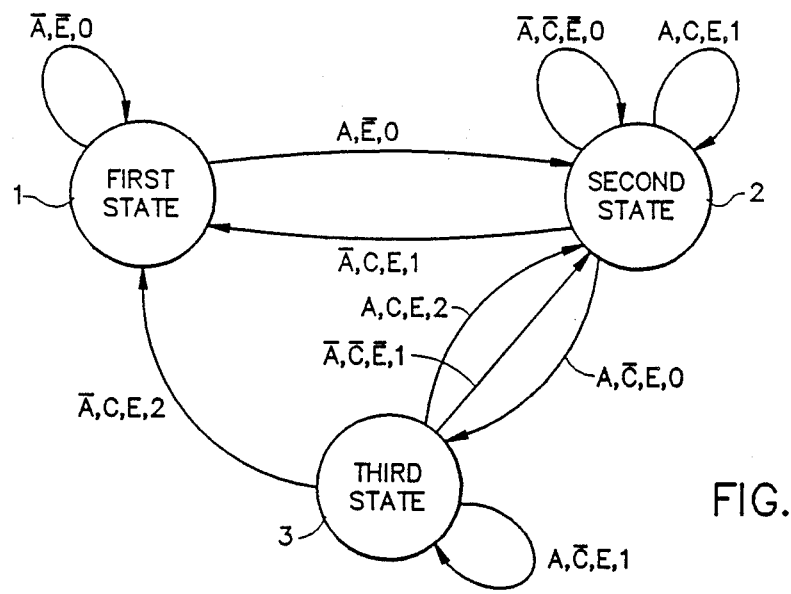
FIG. 3 is a state diagram of the state machine in the phase accumulator of FIG. 2.

A state diagram for the state machine 72 is set forth as FIG. 3; and Table 1 sets forth the response of the state machine 72 to the combinations of the accumulator carry bit A and the comparator carry bit C during each of three different states of the state machine 91.

TABLE 1

| STATE | A | C | COUNT | E | NEXT STATE |
|---|---|---|---|---|---|
| 1 | 0 | 0 | 0 | 0 | 1 |
| 1 | 0 | 1 | 0 | 0 | 1 |
| 1 | 1 | 0 | 0 | 0 | 2 |
| 1 | 1 | 1 | 0 | 0 | 2 |
| 2 | 0 | 0 | 0 | 0 | 2 |
| 2 | 0 | 1 | 1 | 1 | 1 |
| 2 | 1 | 0 | 0 | 1 | 3 |
| 2 | 1 | 1 | 1 | 1 | 2 |
| 3 | 0 | 0 | 1 | 0 | 2 |
| 3 | 0 | 1 | 2 | 1 | 1 |
| 3 | 1 | 0 | 1 | 1 | 3 |
| 3 | 1 | 1 | 2 | 1 | 2 |

The first state 1, state 1, represents the previous sampling period; the second state, state 2, represents the present sampling period; and the third state, state 3, represent the next sampling period. The "E" column indicates the conditions under which an enable signal E is provided by the state machine 72 to the limit register 68 for registering a new random value in the limit register 68. The "NEXT STATE" column indicates the state of the state machine 72 during the subsequent sampling period.

Figure 4:
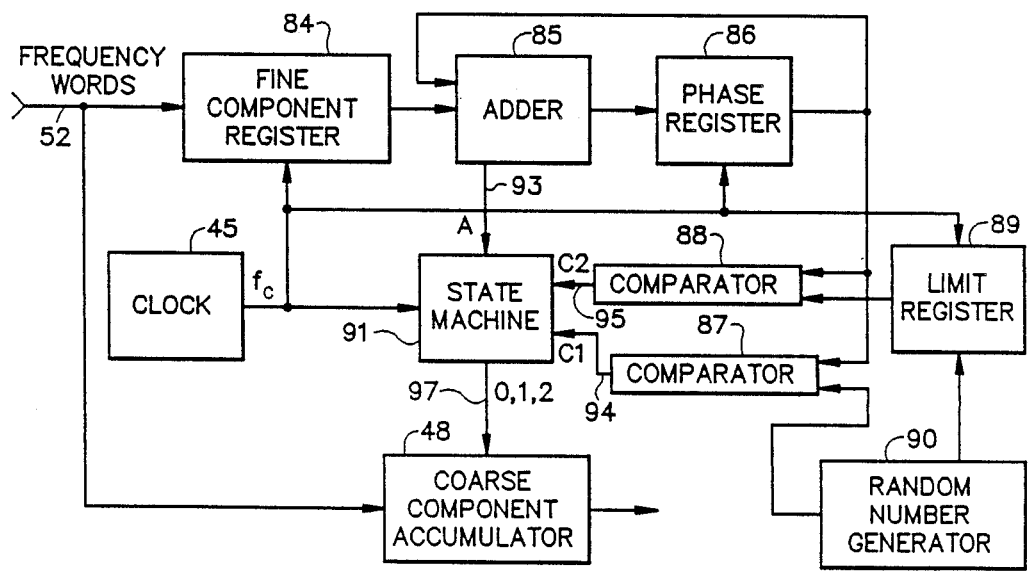
FIG. 4 is a block diagram of another preferred embodiment of the phase accumulator of the present invention.

Referring to FIG. 4, another preferred embodiment of the phase accumulator of the present invention includes an f-bit fine-component register 84, an adder 85, a phase register 86, a first comparator 87, a second comparator 88, a limit register 89, a random number generator 90, a state machine 91, a c-bit coarse-component accumulator 48 and a clock 45. The f-bit fine-component register 84, the phase register 86, the limit register 89, the state machine 91, and the c-bit coarse-component accumulator 48 are synchronously clocked at a rate $f_c$ by a clock signal provided by the clock 45.

The phase accumulator is an m-bit accumulator for accumulating phase components of k-bit digital frequency words 52. The digital frequency words 52, as accumulated, represent the phase of a sine wave of a predetermined frequency.

The c-bit coarse-component accumulator 48 accumulates coarse phase components of the digital frequency words 52; and the f-bit fine-component register 84 registers fine phase components of the digital frequency words 52.

The fine phase components are shifted in parallel from the fine-component register 84 through the adder 85 into the phase register 86, and are accumulated in the phase register 86. Whenever the fine phase components accumulated in the phase register 86 exceed the capacity of the phase register 86, the adder 85 responds by providing an accumulator carry bit "A" to the state machine 91 via line 93.

The coarse component-accumulator 48 includes a coarse-component register, an adder and a phase register configured and operable in the same manner as the fine-component register 84, the adder 85 and the phase register 86.

The first comparator 87 compares the value in the phase register 86 with the value then provided by the random number generator 90 and provides a comparator carry bit "C1" to the state machine 91 via line 94 whenever the value in the phase register 86 exceeds the value then provided by the random number generator 90.

The second comparator 88 compares the value in the phase register 86 with the value in the limit register 89, and provides a comparator carry bit "C2" to the state machine 91 via line 95 whenever the value in the phase register 86 exceeds the value in the limit register 89. The value in the limit register 89 is provided by the random number generator 90. A new value is entered into the limit register 89 from the random number generator 90 in response to each clock pulse from the clock 45. The value in the limit register 89 is the same as that provided by the random number generator 90 during the previous sampling period.

This use of the two comparators 87, 88 in comparison to the use of only one comparator in the embodiment of FIG. 2 allows the limit register 89 to be loaded independently of the functioning of the state machine 91, which in turn enables the generation of the accumulator carry bit A to be fully pipelined with the generation of the comparator carry bits C1 and C2. However, the value of the fine phase components of the frequency words 52 must be at least one-half the value of the least significant bit of the coarse-component accumulator 48, which in turn limits the number of comparisons to not more than two during any one fine-phase-component-accumulation period.

Each time the state machine 91 is sampled by the clock signal from the clock 45, the state machine 91 provides a carry count of either 0, 1, or 2 to the coarse-component register 48 via lines 97 in accordance with the number of times the accumulated fine phase components exceed the randomly generated value during the sampling period, as indicated by a combination of the state of the state machine 91 and whether an accumulator carry bit A and/or a comparator carry bit C1 and C2 is provided to the state machine 91 when the state machine 91 is sampled.

The adder of the coarse-component accumulator 48 increments the accumulated coarse phase components in the phase register thereof by the carry count on line 97 from the state machine 91 together with and at the same time as when it increments such accumulated coarse phase components by the coarse phase component in the coarse-component register thereof.

Table 2 sets forth the response of the state machine 91 to the combinations of the accumulator carry bit A and the comparator carry bits C1 and C2 during each of four different states of the state machine 91.

TABLE 2

| STATE | A | C1 | C2 | COUNT | NEXT STATE |
|---|---|---|---|---|---|
| 1 | 0 | 0 | X | 1 | 3 |
| 1 | 0 | 1 | X | 2 | 4 |
| 1 | 1 | 0 | X | 1 | 1 |
| 1 | 1 | 1 | X | 2 | 2 |
| 2 | 0 | 0 | X | 0 | 3 |
| 2 | 0 | 1 | X | 1 | 4 |
| 2 | 1 | 0 | X | 0 | 1 |
| 2 | 1 | 1 | X | 1 | 2 |
| 3 | 0 | X | 0 | * | * |
| 3 | 0 | X | 1 | * | * |
| 3 | 1 | X | 0 | 0 | 1 |
| 3 | 1 | X | 1 | 1 | 2 |
| 4 | 0 | X | X | * | * |
| 4 | 1 | X | X | 0 | 2 |

In Table 2, an "X" indicates that the state of the particular bit is immaterial, and an "*" indicates an illegal condition because it would imply more than two comparisons during a fine-phase-component-accumulation period.

The first state, state 1, of the state machine 91 is a state in which the comparison is made by the first comparator 87 in a sampling period following a sampling period in which no comparator carry bit C1 or C2 was provided; the second state, state 2, is a state in which the comparison is made by the first comparator 87 in a sampling period following a sampling period in which a comparator carry bit C1 or C2 was provided; the third state, state 3, is a state in which the comparison is made by the second comparator 88; and the fourth state, state 4, is a sampling period following a first or second state sampling period in which a comparator carry bit C1 or C2 was provided but an accumulator carry bit A was not provided.

The "NEXT STATE" column indicates the state of the state machine 91 during the subsequent sampling period.

I claim:

1. A phase accumulator for accumulating digital frequency words, which, as accumulated, represent the phase of a cyclic waveform of a predetermined frequency, comprising a coarse-component accumulator for accumulating coarse phase components of the digital frequency words;

a fine-component accumulator for accumulating fine phase components of the digital frequency words; and means for incrementing the coarse-component accumulator in response to accumulation of the fine phase components;

wherein said incrementing means comprise means for providing a variable randomly generated value for each fine-component accumulation cycle;

means for periodically sampling the accumulation of the fine phase components in relation to the randomly generated value; and means for incrementing the coarse component register for each fine-component accumulation cycle, with the phase of said incrementing being dithered in accordance with the number of times the accumulated fine phase components exceed the randomly generated values during the sampling period.

2. A phase accumulator according to claim 1, wherein the combination of the fine-component accumulator and the incrementing means comprise means for generating random values;

a limit register for registering said generated random values;

a fine-phase register;

means for incrementing the fine-phase register whenever the accumulated fine phase components exceed a predetermined value, and for providing an indication that said predetermined value has been exceeded;

a comparator for comparing the contents of the fine-phase register with the contents of the limit register, and for providing an indication whenever the value registered in the fine-phase register exceeds the value registered in the limit register;

a state machine for processing the indication provided by the means for incrementing the fine-component register with the indication provided by the comparator to produce carry bits indicating a count in accordance with the number of times the accumulated fine phase components exceed the randomly generated values during the sampling period, as indicated by a combination of the state of the state machine, and indications provided by the means for incrementing the fine-phase register and by the comparator; and means for incrementing the coarse-component register by the count indicated by said carry bits.

3. A phase accumulator according to claim 1, wherein the combination of the fine-component accumulator and the incrementing means comprise means for generating random values;

a limit register for registering said generated random values;

a fine-phase register;

means for incrementing the fine-phase register whenever the accumulated fine phase components exceed a predetermined value, and for providing an indication that said predetermined value has been exceeded;

a first comparator for comparing the contents of the fine-phase register with the then generated random value, and for providing an indication whenever the value registered in the fine-phase register exceeds the then generated random value;

a second comparator for comparing the contents of the fine-phase register with the contents of the limit register, and for providing an indication whenever the value registered in the fine-phase register exceeds the value registered in the limit register;

a state machine for processing the indication provided by the means for incrementing the fine-component register with the indication provided by the comparators to produce carry bits indicating a count in accordance with the number of times the accumulated fine phase components exceed the randomly generated values during the sampling period, as indicated by a combination of the state of the state machine, and indications provided by the means for incrementing the fine-phase register and by the comparators; and means for incrementing the coarse-component register by the count indicated by said carry bits.

* * * * *